(12) United States Patent
Maekawa

(10) Patent No.: US 12,341,937 B2
(45) Date of Patent: Jun. 24, 2025

(54) INFORMATION PROCESSING APPARATUS AND NON-TRANSITORY COMPUTER READABLE MEDIUM

(71) Applicant: FUJIFILM Business Innovation Corp., Tokyo (JP)

(72) Inventor: Hiroaki Maekawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 630 days.

(21) Appl. No.: 17/541,264

(22) Filed: Dec. 3, 2021

(65) Prior Publication Data

US 2023/0010060 A1    Jan. 12, 2023

(30) Foreign Application Priority Data

Jul. 7, 2021   (JP) ................... 2021-112551

(51) Int. Cl.
*H04N 1/00*    (2006.01)

(52) U.S. Cl.
CPC . *H04N 1/00938* (2013.01); *H04N 2201/0094* (2013.01)

(58) Field of Classification Search
None
See application file for complete search history.

(56) References Cited

U.S. PATENT DOCUMENTS

| | | |
|---|---|---|
| 8,640,102 B2 | 1/2014 | Ogura |
| 2008/0178200 A1 | 7/2008 | Kaneko et al. |
| 2013/0163035 A1* | 6/2013 | Kamiya .................. G06F 3/123 358/1.15 |
| 2017/0286087 A1 | 10/2017 | Naota |
| 2020/0310918 A1 | 10/2020 | Okayama |

FOREIGN PATENT DOCUMENTS

| | | |
|---|---|---|
| JP | 2006239994 | 9/2006 |
| JP | 2008123388 | 5/2008 |
| JP | 2012022621 | 2/2012 |
| JP | 2015125723 | 7/2015 |
| JP | 2017187889 | 10/2017 |
| JP | 6225981 B2 * | 11/2017 |
| JP | 2020167622 | 10/2020 |

OTHER PUBLICATIONS

"Notice of Reasons for Refusal of Japan Counterpart Application", issued on Mar. 25, 2025, with English translation thereof, p. 1-p. 8.

* cited by examiner

*Primary Examiner* — Fan Zhang
(74) *Attorney, Agent, or Firm* — JCIPRNET

(57) ABSTRACT

An information processing apparatus includes a processor configured to specify information to be incorporated into a first apparatus by referring to information incorporated into a second apparatus that differs from the first apparatus and that is disposed within a predetermined region around a location of the first apparatus.

15 Claims, 8 Drawing Sheets

FIG. 2

| AUTHENTICATION INFORMATION | | USERNAME | DEPARTMENT | SEAT |
|---|---|---|---|---|
| USER ID | PASSWORD | | | |
| u0001 | pass1 | YAMADA TARO | FIRST SALES SECTION | 5C5 |
| u0002 | pass2 | SATO HANAKO | ADMINISTRATION SECTION | 5A2, 2B3 |
| ⋮ | | | | |

FIG. 3

| MODEL NAME | F/W VERSION | APP (VERSION) THAT CAN BE INSTALLED |
|---|---|---|
| model110 | V1.11 | app001 (v5.0), app003 (v4,1), ・・・ |
| model120 | V1.20 | app001 (v5.1), app004 (v1.0), ・・・ |
| model13 | V2.01 | app002 (v2.2), app003 (v4.1), ・・・ |
| | | |

FIG. 4

| APPARATUS ID | MODEL NAME | ADDRESS INFORMATION | APPLICATION | CONFIGURATION INFORMATION | |
|---|---|---|---|---|---|
| | | | | COMMON | INDIVIDUAL |
| MFP-A | MFP01 | 012.345.678.9 | app001, app003, · · · · | | |
| MFP-B | MFP02 | 012.345.678.10 | app001, app008, · · · · | | |
| · · · | | | | | |

FIG. 5A

| FLOOR | ROOM NUMBER | APPARATUS | POSITIONAL INFORMATION |
|---|---|---|---|
| ⋮ | | | |
| 4 | | ... | ... |
| 5 | 501 | MFP-A | (xa, ya) |
| | | MFP-B | (xb, yb) |
| | | MFP-C | (xc, yc) |
| | | MFP-X | (xx, yx) |
| 6 | | ... | ... |
| ⋮ | | | |

FIG. 5B

| FLOOR | ROOM NUMBER | SEAT ID | POSITIONAL INFORMATION | USER |
|---|---|---|---|---|
| ⋮ | | | | |
| 4 | | ... | ... | |
| 5 | 501 | A1 | (x51a, y5a1) | u0123 |
| | | A2 | (x5a2, y5a2) | u0002 |
| | | ⋮ | | |
| 6 | | ... | ... | |
| ⋮ | | | | |

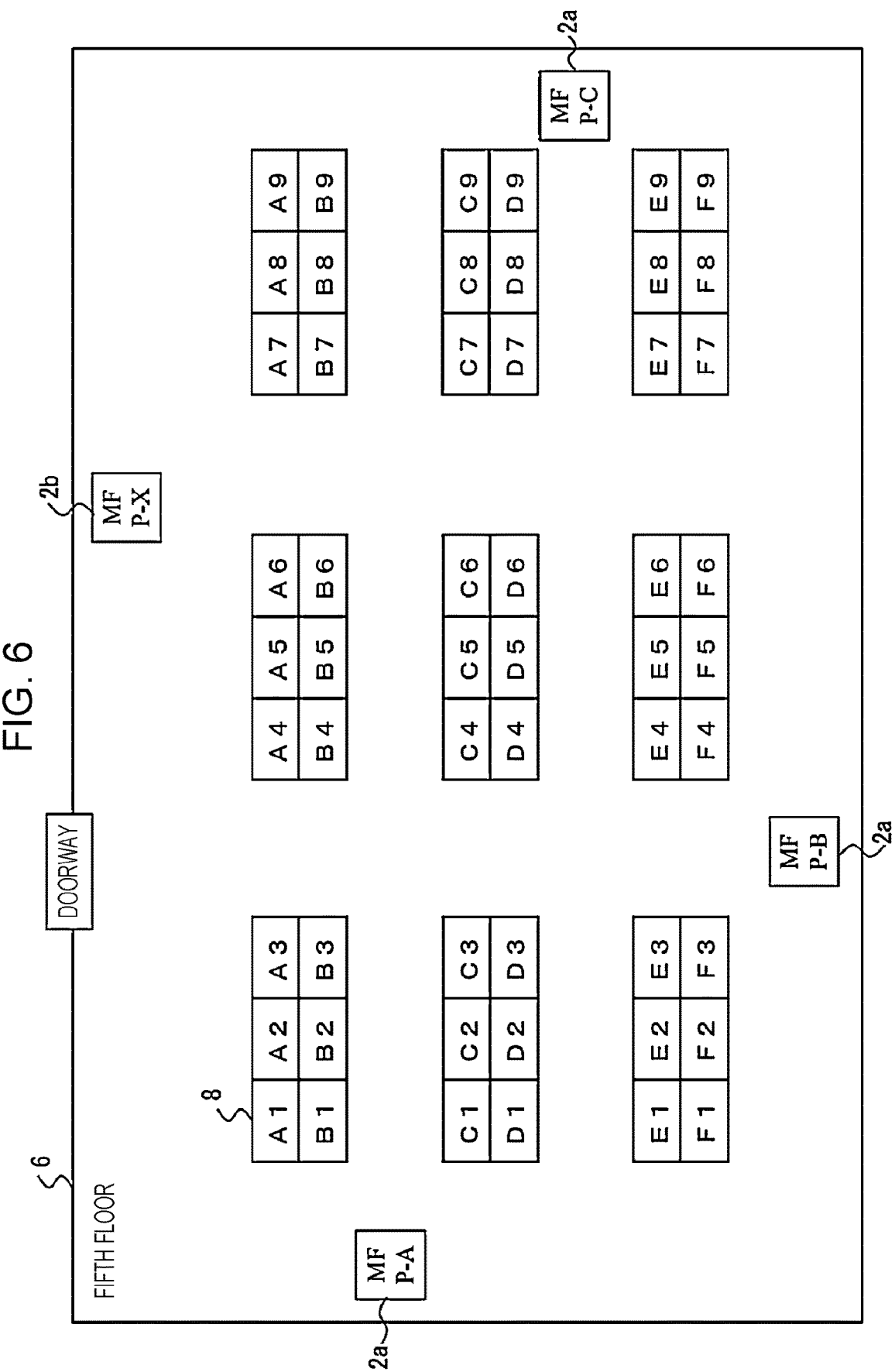

FIG. 7

| DATE AND TIME | APPARATUS | USER | APP | DETAILED INFORMATION |
|---|---|---|---|---|
| | | | | FUNCTION USED<br>EXECUTION TIME<br>NUMBER OF SHEETS USED<br>:<br>: |

INFORMATION PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2021-112551 filed Jul. 7, 2021.

BACKGROUND

(i) Technical Field

The present disclosure relates to an information processing apparatus and a non-transitory computer readable medium.

(ii) Related Art

When a multifunction peripheral is disposed in a facility, information such as an application to be used may be acquired and incorporated in advance to enable prompt use of the multifunction peripheral.

To provide information likely to be used by an image forming apparatus, an image processing apparatus known in the art acquires from outside a program licensed to a user and enables use of the program in response to user login to the image forming apparatus (for example, refer to Japanese Unexamined Patent Application Publication No. 2012-022621).

When handling information for which security needs to be ensured, an image forming apparatus known in the art saves the information in a server for backup before erasing the information. Then, when the information, which has been erased, is to be used, the image forming apparatus downloads the information from the server (for example, refer to Japanese Unexamined Patent Application Publication No. 2020-167622). Japanese Unexamined Patent Application Publication No. 2006-239994 is another example known in the art.

SUMMARY

Aspects of non-limiting embodiments of the present disclosure relate to enabling easy specification of one or more applications and configuration information to be incorporated into an apparatus. The one or more applications and configuration information are specified as having a high possibility of being used by the apparatus out of applications and configuration information that have been incorporated into other apparatuses. A user can more easily select the one or more applications and configuration information, which are to be incorporated into the apparatus, than in the case of selecting and specifying one or more applications and configuration information without such support.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to specify information to be incorporated into a first apparatus by referring to information incorporated into a second apparatus that differs from the first apparatus and that is disposed within a predetermined region around a location of the first apparatus.

BRIEF DESCRIPTION OF THE DRAWINGS

Exemplary embodiments of the present disclosure will be described in detail based on the following figures, wherein:

FIG. 2 is an illustration depicting an example of a data structure of user information stored in a user-information repository according to the first exemplary embodiment;

FIG. 3 is an illustration depicting an example of a data structure of app information stored in an app-information repository according to the first exemplary embodiment;

FIG. 4 is an illustration depicting an example of a data structure of apparatus information stored in an apparatus-information repository according to the first exemplary embodiment;

FIG. 5A is an illustration depicting an example of a data structure of information regarding multifunction peripherals in floor information, which is referred to as floor information (multifunction peripheral), stored in a floor-information repository according to the first exemplary embodiment;

FIG. 5B is an illustration depicting an example of a data structure of information regarding seats in the floor information, which is referred to as floor information (seat), stored in the floor-information repository according to the first exemplary embodiment;

FIG. 6 is a plan view depicting an arrangement of multifunction peripherals and seats disposed on a floor according to the first exemplary embodiment;

FIG. 7 is an illustration depicting an example of a data structure of usage-history information stored in a usage-history-information repository according to the first exemplary embodiment;

DETAILED DESCRIPTION

Hereinafter, exemplary embodiments of the present disclosure will be described with reference to the drawings.

First Exemplary Embodiment

Figure 1:
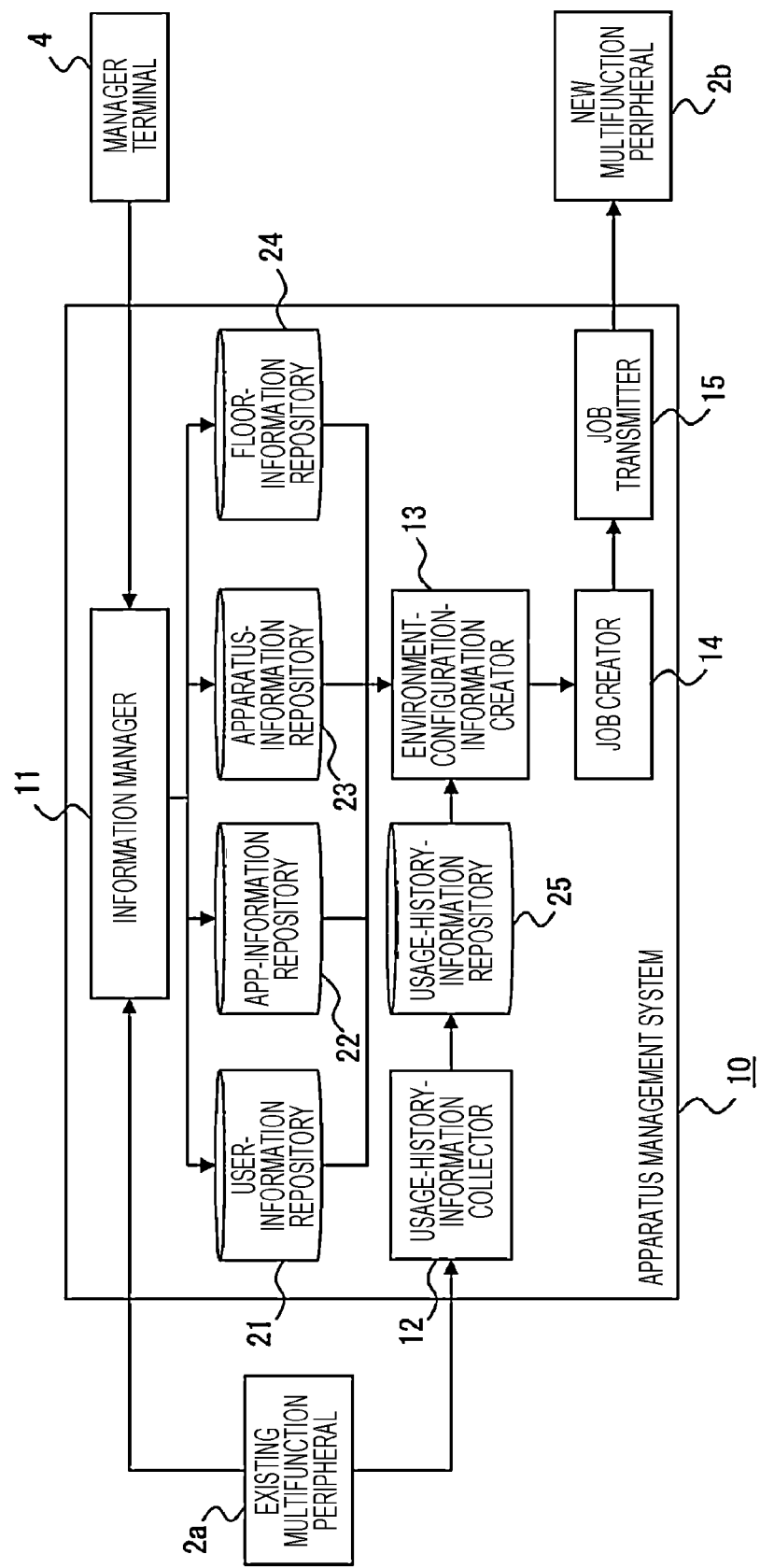
FIG. 1 is a block diagram depicting an example configuration of an apparatus management system according to a first exemplary embodiment.

FIG. 1 is a block diagram depicting an example configuration of an apparatus management system 10 according to the present exemplary embodiment. FIG. 1 depicts the apparatus management system 10, an existing multifunction peripheral 2a, a new multifunction peripheral 2b, and a manager terminal 4. The apparatus management system 10 is communicatively connected to the existing multifunction peripheral 2a, the new multifunction peripheral 2b, and the manager terminal 4 by using a network, such as a local area network (LAN), which is not depicted. When the existing multifunction peripheral 2a and the new multifunction peripheral 2b need not be distinguished, these multifunction peripherals are generically referred to as a "multifunction peripheral 2".

The apparatus management system 10 in the present exemplary embodiment corresponds to an information processing apparatus according to the present disclosure and can be formed by using a general-purpose hardware configuration known in the art, such as a personal computer (PC). Specifically, the apparatus management system 10 is formed by connecting to an internal bus a central processing unit (CPU), a read-only memory (ROM), a random-access memory (RAM), a hard disk drive (HDD) as a storage unit, a network interface installed as a communication unit, and a user interface including an input unit, such as a mouse and keyboard, and a presentation unit, such as a display. The apparatus management system 10 can be formed by using a single information processing apparatus but may be formed by a combination of multiple information processing apparatuses.

The existing multifunction peripheral 2a has been disposed in a facility such as a building and has been used by users. The new multifunction peripheral 2b is newly disposed in the facility. The new multifunction peripheral 2b, which is generally brand new, is disposed at a predetermined location in the facility and will be used after the installation. However, the existing multifunction peripheral 2a is moved to a new location in some cases and handled as the new multifunction peripheral 2b as described below.

The multifunction peripheral 2 is an example of an apparatus managed by the apparatus management system 10. Description will be provided with regard to the multifunction peripheral 2 as an example of an apparatus managed by the apparatus management system 10 in the present exemplary embodiment, and the term "multifunction peripheral" and the term "apparatus" have the same meaning in the following description.

The multifunction peripheral 2 is one form of an image forming apparatus and has various functions such as a printing function, a copying function, and a scanning function. The multifunction peripheral 2 includes a ROM, a RAM, an operation panel used as a user interface, a hard disk drive used as a storage unit, a network interface disposed as a communication unit, a scanner, and a printer.

The manager terminal 4 is an information processing apparatus used by a manager who manages the multifunction peripheral 2 in the facility and can be formed, for example, by a PC having a general-purpose hardware configuration.

The apparatus management system 10 in the present exemplary embodiment includes an information manager 11, a usage-history-information collector 12, an environment-configuration-information creator 13, a job creator 14, a job transmitter 15, a user-information repository 21, an app-information repository 22, an apparatus-information repository 23, a floor-information repository 24, and a usage-history-information repository 25. Any component that is not referred to in the description of the present exemplary embodiment is omitted in FIG. 1.

The information manager 11 performs management such as registering information and updating and deleting registered information in the repositories 21 to 24 based on information acquired from the existing multifunction peripheral 2a or the manager terminal 4. Upon acquiring information regarding usage of the existing multifunction peripheral 2a from the existing multifunction peripheral 2a, the usage-history-information collector 12 registers the information in the usage-history-information repository 25 as information regarding usage history (hereinafter, referred to as "usage-history information").

The environment-configuration-information creator 13 refers to information stored in the repositories 21 to 25 and specifies information to be incorporated into the new multifunction peripheral 2b, and the specified information is referred to as environment-configuration information. The job creator 14 creates a job to configure the new multifunction peripheral 2b by using the environment-configuration information, which is specified by the environment-configuration-information creator 13. The job transmitter 15 transmits a job created by the job creator 14 to the new multifunction peripheral 2b.

The environment-configuration information is incorporated into the new multifunction peripheral 2b as described above and includes one or more applications, which are to be installed on the new multifunction peripheral 2b, and configuration information, which includes personal information and parameter values. The configuration information represents various kinds of information other than an application and facilitates the use of the new multifunction peripheral 2b. In summary, one or more applications and configuration information are incorporated into the new multifunction peripheral 2b in the present exemplary embodiment. The term "application" is sometimes abbreviated to "app" in the present exemplary embodiment.

FIG. 2 is an illustration depicting an example of a data structure of user information stored in the user-information repository 21 according to the present exemplary embodiment. The user information represents information regarding users who use the multifunction peripheral 2. In other words, only users whose user information is registered in the user-information repository 21 can use the multifunction peripheral 2. User information includes items denoted by "authentication information", "username", "department", and "seat". The item "authentication information" represents authentication information that is assigned to each user, and the authentication information is formed by a combination of a user identification (ID) to identify a user and a password whose input is requested by the multifunction peripheral 2 when the user starts to use the multifunction peripheral 2. When starting to use the multifunction peripheral 2, the user specifies the authentication information to log in. The item "username" represents a piece of information to identify the user and is composed of first and family names of the user. The item "department" represents a department to which the user belongs. The item "seat" represents information to specify the position of a seat that is provided in the facility and that is assigned to the user. The item "seat" is set to receive a seat ID as information to identify a seat.

FIG. 3 is an illustration depicting an example of a data structure of app information stored in the app-information repository 22 according to the present exemplary embodiment. The app information represents information related to one or more applications that can be installed on each multifunction peripheral 2. In other words, an application whose app information is not registered in the app-information repository 22 is not allowed to be installed on the multifunction peripheral 2. The app information includes items denoted by "model name", "firmware (F/W) version", and "app (version) that can be installed". The item "model name" represents a model name of the multifunction peripheral 2 and also represents information to specify a machine type. The item "firmware (F/W) version" represents the version of the firmware installed on the multifunction peripheral 2. The item "app (version) that can be installed" represents the name of an application that can be installed on the multifunction peripheral 2 and a version of the application. It is assumed in the present exemplary embodiment that each application has downward version compatibility, and only the latest version that can be installed is specified. If this assumption does not hold true, each version that can be installed on the multifunction peripheral 2 needs to be specified.

FIG. 4 is an illustration depicting an example of a data structure of apparatus information stored in the apparatus-information repository 23 according to the present exemplary embodiment. The apparatus-information repository 23 stores apparatus information regarding all multifunction peripherals 2 managed by the apparatus management system 10. The apparatus information includes items denoted by "apparatus ID", "model name", "address information", "application", "configuration information", and "user". The item "apparatus ID" represents an example of information to identify a multifunction peripheral 2. The item "model name" represents the model name of the multifunction peripheral 2. The item "address information" represents information that is necessary to access the multifunction peripheral 2, such as an IP address. The item "application" is set to receive names of one or more applications installed on the multifunction peripheral 2. The item "configuration information" represents information that is incorporated into the multifunction peripheral 2 and that is other than an application. The item "configuration information" is divided into two groups denoted by "common" and "individual". Of the two groups, the group "common" is set to store information shared by multiple users when multiple users use the multifunction peripheral 2. Examples of the information shared by multiple users include information regarding settings (such as an initial value) for a multifunction peripheral. The settings are not individually configured for each user and are shared by all users. Examples of the information shared by multiple users also include information such as an app to be installed by default in common for all users. The group "individual" is set to receive information that is individually used by a user. Examples of such information include account information and an address book of the user and information regarding a favorite and a customized user interface screen. The item "configuration information" includes both of the groups "common" and "individual" in the present exemplary embodiment but may include at least one group. The item "user" is set to receive user IDs of registered users who are allowed to use the multifunction peripheral.

In terms of the apparatus information, one or more applications and configuration information have already been incorporated into the existing multifunction peripheral 2a. In contrast, one or more applications and configuration information are incorporated into the new multifunction peripheral 2b by performing a set-up process for new multifunction peripheral, which will be described below. The apparatus management system 10 specifies one or more applications and configuration information to be incorporated into the new multifunction peripheral 2b by referring to one or more applications and configuration information incorporated into the existing multifunction peripheral 2a. The item "user" may be included in the information to be incorporated into the new multifunction peripheral 2b.

FIGS. 5A and 5B are illustrations depicting an example of a data structure of floor information stored in the floor-information repository 24 according to the present exemplary embodiment. The floor information includes information regarding multifunction peripherals 2 disposed on each floor in the facility and information regarding the seat of each user. Of the floor information, information regarding the multifunction peripherals 2, which is referred to as floor information (multifunction peripheral), is depicted in FIG. 5A, and information regarding seats, which is referred to as floor information (seat), is depicted in FIG. 5B.

The facility will be described herein with reference to FIG. 6 before description of the floor information.

It is assumed that the facility in the present exemplary embodiment has multiple floors. The present exemplary embodiment may naturally be applied to a facility having only one floor. FIG. 6 is a plan view depicting an arrangement of the multifunction peripherals 2 and seats 8 disposed in a room 6 on the fifth floor in the facility. For convenience of description, it is assumed that the fifth floor has only one room in the present exemplary embodiment. Accordingly, the term "floor" and the term "room" indicate the same thing on the fifth floor. The seats 8 identifiable by seat IDs A1 to F9 are arranged in the room 6 on the fifth floor. Three existing multifunction peripherals 2a having the apparatus IDs "MFP-A", "MFP-B", and "MFP-C" are disposed in the room 6 on the fifth floor. FIG. 6 depicts a new multifunction peripheral 2b with the apparatus ID "MFP-X", which is to be disposed in the room 6.

Returning to FIG. 5A, floor information regarding the multifunction peripherals 2 includes items denoted by "floor", "room number", "apparatus", and "positional information". The item "floor" represents a level of the facility. The item "room number" represents a number to identify a room situated on the floor. The item "apparatus" is set to receive apparatus IDs of the multifunction peripherals 2 disposed in the room. The item "positional information" represents information to specify locations of the multifunction peripherals 2 in the room, and the locations are represented by coordinate data. The location of each multifunction peripheral 2 is represented by using a two-dimensional coordinate system whose origin is set at one point in the room, for example, the lower left corner in the plan view. The location of the multifunction peripheral 2 is specified by coordinate data of a predetermined point, such as the center or the lower left corner of the multifunction peripheral 2.

Information regarding seats, which is depicted in FIG. 5B, includes items denoted by "floor", "room number", "seat ID", "positional information", and "user". The items "floor" and "room number" each represent the same thing as in the floor information regarding the multifunction peripherals 2. The item "seat ID" represents information to identify each seat disposed in the room. The item "positional information" represents information to specify the location of a seat 8 in the room. The position of each seat 8 is represented by using a two-dimensional coordinate system whose origin is set at one point in the room, for example, the lower left corner in the plan view. The position of the seat 8 is specified by coordinate data of a predetermined point, such as the center or the lower left corner of the seat 8. The item "user" is set to receive the user ID of the user who uses each of the seats. It is assumed in the present exemplary embodiment that a seat 8 has been assigned to each user in advance. However, multiple seats 8 may be assigned to a single user, such as a user having the user ID "u0002" in the user information depicted in FIG. 2.

A user and a seat are linked by the item "seat" in the user information and by the item "user" in the floor information (seat) in the present exemplary embodiment, but one of the two items may be omitted.

FIG. 7 is an illustration depicting an example of a data structure of usage-history information stored in the usage-history-information repository 25 according to the present exemplary embodiment. The usage-history information includes information regarding a usage record indicating that the information incorporated into the multifunction peripherals 2 has been used by a user. The usage-history information includes items denoted by "date and time", "apparatus", "user", "app", and "detailed information". The item "date and time" represents information indicating the date and time that a user used a multifunction peripheral 2. The item "apparatus" is set to receive an apparatus ID as the information to specify a multifunction peripheral 2 used by the user. The item "user" is set to receive a user ID as the information to specify the user who used the multifunction peripheral 2. The item "app" is set to receive an app ID as the information to specify an application executed when the user used the multifunction peripheral 2. The item "detailed information" represents information related to the use of the multifunction peripheral 2, and content of the information to be registered differs depending on an application to be performed. The item "detailed information" includes common information and individual information. The common information is set in common regardless of the type of application while the individual information is set depending on the type of application. Examples of the common information include one or more functions that were used by the executed application and an execution time of the application. The one or more functions are selected from various functions, such as printing, scanning, and faxing, which are provided by the multifunction peripheral 2. Examples of the individual information include print attribute information that the user selected when using an application that uses a printing function, and the print attribute information includes the number of printed sheets, the settings for enlargement and reduction, a color attribute, and the size of a sheet.

Operation of each of the components 11 to 15 of the apparatus management system 10 is achieved by operational cooperation between a computer forming the apparatus management system 10 and programs operating on the CPU installed on the computer. Operation of each of the repositories 21 to 25 is achieved by a storage unit such as an HDD installed on the apparatus management system 10. Alternatively, a storage unit located outside may be used via a network.

The programs used in the present exemplary embodiment may be provided not only via a communication unit but also in a stored form by using a computer-readable recording medium, such as a compact-disc ROM (CD-ROM) or a universal-serial-bus (USB) memory. The programs provided by using the communication unit or the recording medium are installed on the computer, and the CPU of the computer executes the programs consecutively to perform various processes.

Next, operation in the present exemplary embodiment will be described. In the present exemplary embodiment, a case where a multifunction peripheral MFP-X is newly disposed in the room 6 as a new multifunction peripheral 2b will be described as an example, as depicted in FIG. 6. The room 6 is situated on the fifth floor of the facility, and multifunction peripherals MFP-A, MFP-B, and MFP-C are already disposed as existing multifunction peripherals 2a in the room 6.

When this system starts to be used, user information regarding all the users who use this system, app information regarding all the applications that may be installed on the multifunction peripherals 2, and apparatus information and floor information for the existing multifunction peripherals 2a need to be registered in the corresponding repositories 21 to 24. The information manager 11 sets these kinds of information, for example, by acquiring information that has been set by the manager by using the manager terminal 4.

The information manager 11 updates these kinds of information in accordance with instructions from the manager terminal 4 when registered information needs to be modified because of reasons such as a change of the users who use this system, addition or removal of an application installed on an existing multifunction peripheral 2a, and a change in the layout of the floor.

After an existing multifunction peripherals 2a is used by a user, the usage-history-information collector 12 collects usage-history information from the existing multifunction peripheral 2a, which has been used, and registers the usage-history-information in the usage-history-information repository 25. Usage-history information may be collected and registered every time an existing multifunction peripheral 2a is used or may be collected and registered at regular intervals. Alternatively, the usage-history-information collector 12 acquires data corresponding to the items to be included in usage-history information from an existing multifunction peripheral 2a, generates usage-history information, and registers the usage-history information in the usage-history-information repository 25.

Figure 8:
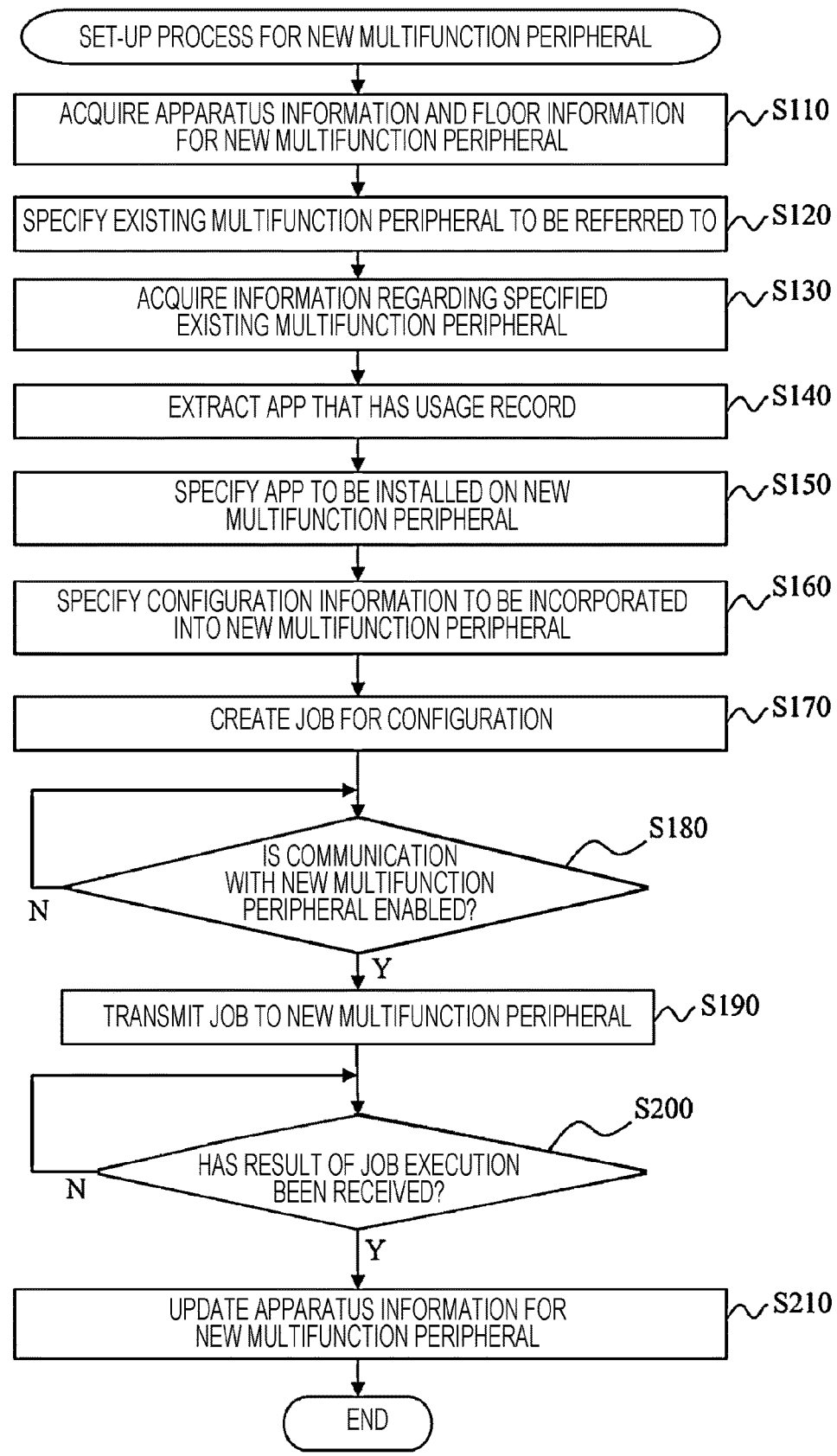
FIG. 8 is a flowchart depicting a set-up process for new multifunction peripheral according to the first exemplary embodiment.

In this way, each of the repositories 21 to 25 reaches a state in which information required at that point and latest information have been registered. Then, when it is determined that a new multifunction peripheral 2b is to be newly disposed in the room 6, the new multifunction peripheral 2b needs to incorporate information and to be configured for use. In the present exemplary embodiment, information to be incorporated into the new multifunction peripheral 2b is specified with reference to the information that has been incorporated into the existing multifunction peripherals 2a, each of which corresponds to a second apparatus disposed within a predetermined region around the location of the new multifunction peripheral 2b. A set-up process for new multifunction peripheral in the present exemplary embodiment will be described herein with reference to a flowchart depicted in FIG. 8. The new multifunction peripheral 2b is configured by incorporating information in the set-up process for new multifunction peripheral. It is assumed that the new multifunction peripheral 2b described herein is brand new and neither application nor configuration information has been incorporated into the new multifunction peripheral 2b.

When the multifunction peripheral MFP-X is to be newly disposed as the new multifunction peripheral 2b in the room 6 as depicted in FIG. 6, the manager enters apparatus information and floor information (multifunction peripheral) for the new multifunction peripheral 2b by using the manager terminal 4 and thereafter requests the apparatus management system 10 to register the information.

A set-up process for new multifunction peripheral will be described by using the multifunction peripheral MFP-X, which serves as an example of the new multifunction peripheral 2b, and the multifunction peripherals MFP-A, MFP-B, and MFP-C, which serve as an example of the existing multifunction peripherals 2a. Thus, the term "new multifunction peripheral 2b" and the term "multifunction peripheral MFP-X" refer to the same multifunction peripheral 2, and the term "existing multifunction peripherals 2a" and the term "multifunction peripherals MFP-A, MFP-B, and MFP-C" refer to the same multifunction peripherals 2.

In response to the apparatus information and the floor information (multifunction peripheral) for the new multifunction peripheral 2b being transmitted from the manager terminal 4 at the request of the manager, the information manager 11 in the apparatus management system 10 acquires the information and registers the information in the apparatus-information repository 23 and the floor-information repository 24 (step S110). The information manager 11 may register the information in the repositories 23 and 24 when performing step S210, which is described below.

Since the location at which the multifunction peripheral MFP-X is disposed has been determined, a data value is provided to the item "positional information" corresponding to the multifunction peripheral MFP-X in the floor information (multifunction peripheral). In contrast, since the new multifunction peripheral 2b is brand new, no data value is provided to the items "application" and "configuration information" in the apparatus information. In the set-up process for new multifunction peripheral, for the multifunction peripheral MFP-X, data values to be provided to the items "application" and "configuration information", which have no data values, are specified with reference to the information incorporated into one or more existing multifunction peripherals 2a disposed in a region around the multifunction peripheral MFP-X.

After the apparatus management system 10 acquires the apparatus information and the floor information for the multifunction peripheral MFP-X from the manager terminal 4, the environment-configuration-information creator 13 in the apparatus management system 10 refers to the floor information and specifies one or more existing multifunction peripherals 2a disposed within a predetermined region around the location of the multifunction peripheral MFP-X. Examples of the predetermined region around the location of the multifunction peripheral MFP-X include a region within a predetermined radius around the location of the multifunction peripheral MFP-X and the floor or the room where the multifunction peripheral MFP-X is disposed. It is assumed in the present exemplary embodiment that the room 6, in which the multifunction peripheral MFP-X is to be disposed, is the predetermined region. Accordingly, with reference to FIG. 6, which depicts the room 6, the environment-configuration-information creator 13 specifies the multifunction peripherals MFP-A, MFP-B, and MFP-C as the existing multifunction peripherals 2a, which are to be referred to when information to be incorporated into the multifunction peripheral MFP-X is specified (step S120).

The environment-configuration-information creator 13 may present to the manager one or more existing multifunction peripherals 2a that have been specified and may allow the manager to select one or more existing multifunction peripherals 2a that are referred to when the information is actually incorporated into the new multifunction peripheral 2b. When presenting the one or more existing multifunction peripheral 2a, the environment-configuration-information creator 13 may allow the manager to select one existing multifunction peripheral 2a that is to be referred to.

Subsequently, the environment-configuration-information creator 13 acquires information regarding the multifunction peripherals MFP-A, MFP-B, and MFP-C, which have been specified (step S130). Specifically, apparatus information and usage-history information corresponding to the existing multifunction peripherals 2a are acquired.

Thereafter, the environment-configuration-information creator 13 specifies one or more applications installed on the existing multifunction peripherals 2a by referring to the apparatus information. Then, the environment-configuration-information creator 13 refers to the usage-history information and extracts one or more applications that have a usage record on the existing multifunction peripherals 2a from the applications that have been specified (step S140).

The item "user" included in the usage-history information is not referred to in the present exemplary embodiment. Whether an application has a usage record may be determined based on a predetermined criterion. For example, if an application has ever been used before or has been used n times (n is a natural number) or more during the most recent predetermined period, it is determined that the application has a usage record. In this way, an application is extracted as a candidate to be installed on the multifunction peripheral MFP-X in the present exemplary embodiment if the application has been installed on the multifunction peripherals MFP-A, MFP-B, and MFP-C, which are specified in step S120, and has a usage record.

Then, the environment-configuration-information creator 13 refers to the model name of the multifunction peripheral MFP-X and the app information and determines whether each application extracted as a candidate can be installed on the multifunction peripheral MFP-X. In this way, the environment-configuration-information creator 13 specifies one or more applications to be installed on the multifunction peripheral MFP-X (step S150). The environment-configuration-information creator 13 needs to check not only the kind of an application but also the version of an application that can be installed.

It is assumed in the above description that an application is extracted as a candidate to be installed on the multifunction peripheral MFP-X if the application has a usage record on any one of the multifunction peripherals MFP-A, MFP-B, and MFP-C. Extraction of a candidate is not limited to the above example. For example, an application may be extracted as a candidate if the application has a usage record on multiple (that is, two or more) existing multifunction peripherals 2a out of the multifunction peripherals MFP-A, MFP-B, and MFP-C or on all the existing multifunction peripherals 2a.

Subsequently, the environment-configuration-information creator 13 specifies as configuration information to be incorporated into the multifunction peripheral MFP-X the configuration information incorporated into the multifunction peripherals MFP-A, MFP-B, and MFP-C, which have been specified in step S120, in the apparatus information (step S160). The configuration information to be incorporated into the multifunction peripheral MFP-X may be obtained by merging the configuration information incorporated into each of the multifunction peripherals MFP-A, MFP-B, and MFP-C. Alternatively, the configuration information to be incorporated into the multifunction peripheral MFP-X may be specified by extracting information incorporated in common into multiple (that is, two or more) existing multifunction peripherals 2a or into all the existing multifunction peripherals 2a.

Further, although the existing multifunction peripherals 2a are treated equally in the above description, weights may be assigned to the existing multifunction peripherals 2a in accordance with some criterion, for example, a distance between the new multifunction peripheral 2b and an existing multifunction peripheral 2a. For example, installation of an application is performed on the new multifunction peripheral 2b if the application has been installed on the existing multifunction peripheral 2a located nearest to the new multifunction peripheral 2b, and installation of an application that has not been installed on the existing multifunction peripheral 2a located nearest to the new multifunction peripheral 2b is performed on the new multifunction peripheral 2b only if the application has been installed on multiple existing multifunction peripherals 2b. Further, if configuration information that is specified as configuration information to be incorporated into the multifunction peripheral MFP-X causes a conflict between multiple existing multifunction peripherals 2a, configuration information incorporated into an existing multifunction peripheral 2a in the apparatus information may be specified as having priority over other configuration information in accordance with weights assigned to the existing multifunction peripherals 2a. Configuration information conflicts with other configuration information, for example, if individual settings for the same user differ for multiple existing multifunction peripherals 2a that are specified.

After the environment-configuration-information creator 13 specifies one or more applications and configuration information as environment-configuration information to be incorporated into the new multifunction peripheral 2b as described above, the job creator 14 creates a job to incorporate the environment-configuration information that has been specified into the new multifunction peripheral 2b (step S170). Before causing the job creator 14 to create the job, the environment-configuration-information creator 13 may present the environment-configuration information to the manager to allow the manager to select information to be actually incorporated into the new multifunction peripheral 2b.

In this way, the apparatus management system 10 completes preparations to make the multifunction peripheral MFP-X available when the multifunction peripheral MFP-X is disposed in the room 6. Then, the apparatus management system 10 waits for the communication with the multifunction peripheral MFP-X to become enabled (N in step S180).

Subsequently, when the multifunction peripheral MFP-X is actually disposed in the room 6, connected to a network in the facility, and configured to be able to communicate with the apparatus management system 10 (Y in step S180), the communication between the apparatus management system 10 and the multifunction peripheral MFP-X becomes enabled. Then, the job transmitter 15 transmits the job created by the job creator 14 to the multifunction peripheral MFP-X (step S190). Thereafter, the apparatus management system 10 waits for the multifunction peripheral MFP-X to transmit the result of job execution (N in step S200).

Upon receiving the job from the apparatus management system 10 via a network, which is not depicted, the multifunction peripheral MFP-X executes the job and sets up an environment so as to allow a user to use the multifunction peripheral MFP-X. The multifunction peripheral MFP-X executes the job and completes the set-up of the environment for use by incorporating the information. Then, the multifunction peripheral MFP-X transmits the result of job execution to the apparatus management system 10.

Execution of the job is generally expected to complete a normal configuration of the multifunction peripheral MFP-X by incorporating all the applications and all the configuration information, which have been specified by the environment-configuration-information creator 13 as environment-configuration information to be incorporated. However, in consideration of a case where the configuration fails for some reason, information to specify the applications and configuration information that have normally been incorporated by the execution of the job is included in the result of job execution and transmitted to the apparatus management system 10 in the present exemplary embodiment.

After the apparatus management system 10 receives the result of job execution from the multifunction peripheral MFP-X (Y in step S200), the information manager 11 in the apparatus management system 10 refers to the result of job execution and updates the apparatus information by adding, to the apparatus information, information regarding the applications and configuration information for the multifunction peripheral MFP-X (step S210).

As described above, the information to be incorporated into the multifunction peripheral MFP-X is specified with reference to the information incorporated into the multifunction peripherals MFP-A, MFP-B, and MFP-C, which are disposed within a predetermined region around the location of the multifunction peripheral MFP-X. The predetermined region corresponds to the room 6, where the multifunction peripheral MFP-X is to be disposed in the present exemplary embodiment. In other words, it is assumed that a user who is to use the new multifunction peripheral 2b also uses the existing multifunction peripherals 2a, which are disposed in the room 6, where the new multifunction peripheral 2b is disposed, and that the user is to use the new multifunction peripheral 2b in a manner similar to the manner in which the user uses the existing multifunction peripherals 2a. The information to be incorporated into the new multifunction peripheral 2b is specified with reference to the information incorporated into the existing multifunction peripherals 2a based on this assumption.

According to the present exemplary embodiment, a user who has a seat in the room 6 can start to use the new multifunction peripheral 2b as easily as the existing multifunction peripherals 2a immediately after the new multifunction peripheral 2b is disposed. In particular, information that has been used by the users who have seats in the room 6, that is, highly usable information is selected and incorporated into the new multifunction peripheral 2b since information to be incorporated is selected with reference to the usage-history information in the present exemplary embodiment. In other words, the new multifunction peripheral 2b does not need to incorporate information that has not been used in practice by the users.

It is assumed in the description of the present exemplary embodiment that the predetermined region around the location of the new multifunction peripheral 2b is, for example, the whole area of the room where the new multifunction peripheral 2b is to be disposed, but the predetermined region around the location of the new multifunction peripheral 2b is not limited to the whole area and may be a portion of the whole area of the room. Specifying a fixed region as the predetermined region enables multiple existing multifunction peripherals 2a to be extracted. However, this example is not meant to be limiting, and the term "predetermined region" may be construed, for example, as indicating a variable region so that only the existing multifunction peripheral 2a disposed nearest to the new multifunction peripheral 2b can be specified.

Existing multifunction peripherals 2a may be linked together to specify an existing multifunction peripheral 2a that is to be referred to in incorporating information into the new multifunction peripheral 2b. For example, a first existing multifunction peripheral 2a specified based on the location of the new multifunction peripheral 2b may be linked to a second existing multifunction peripheral 2a that has been configured similarly to the first existing multifunction peripheral 2a.

Multiple new multifunction peripherals 2b are disposed in the room 6 in some cases. In such a case, the process described above may be performed on each of the multiple new multifunction peripherals 2b.

Further, it is assumed in the above description that the new multifunction peripheral 2b is brand new and thus has incorporated no information. However, the new multifunction peripheral 2b may be an existing multifunction peripheral that is moved from another room. The new multifunction peripheral 2b, which is to be disposed in the new room, has incorporated some information since the new multifunction peripheral 2b has been used in the old room.

The set-up process for new multifunction peripheral in this case may have a process flow basically similar to the process flow described above. Specifically, the manager uses the manager terminal 4 to enter floor information (multifunction peripheral) to specify a destination to which the new multifunction peripheral 2b is moved. Information regarding apparatus information need not be entered since apparatus information has already been incorporated into the new multifunction peripheral 2b. However, the IP address may need to be updated for a management purpose.

In response to information for the new multifunction peripheral 2b being transmitted from the manager terminal 4 at the request of the manager, the information manager 11 acquires the information and registers the information in the floor-information repository 24 for update (step S110). Only the IP address needs to be updated as necessary in the apparatus information.

Subsequently, the environment-configuration-information creator 13 specifies one or more applications and configuration information to be incorporated into the new multifunction peripheral 2b as described above (steps S120 to S160).

The new multifunction peripheral 2b differs from a brand new multifunction peripheral in that one or more applications and configuration information have already been incorporated into the new multifunction peripheral 2b in the apparatus information. It is possible that the one or more applications and configuration information included in the environment-configuration information created by the environment-configuration-information creator 13 differ from the one or more applications and configuration information that have already been incorporated into the new multifunction peripheral 2b in the apparatus information. For example, there are three possibilities in the case of application; (a) an application included in the environment-configuration information has been registered in the apparatus information, (b) an application included in the environment-configuration information has not been registered in the apparatus information, and (c) an application that is not included in the environment-configuration information has been registered in the apparatus information. No attention needs to be paid to an application that is included neither in the environment-configuration information nor in the apparatus information.

An application categorized as the possibility (a) does not need to be newly installed on the new multifunction peripheral 2b. Specifically, a job to be created does not need to include an installation process for the application. The application may naturally be updated at this time if a process of updating to the latest version or other operation is necessary. An application categorized as the possibility (b) needs to be installed on the new multifunction peripheral 2b. Specifically, a job needs to be created to install the application, which is to be incorporated, as in the case of the new multifunction peripheral 2b being brand new. An application categorized as the possibility (c) has been installed on the new multifunction peripheral 2b but is unnecessary when the new multifunction peripheral 2b is moved to the destination. Thus, a job is created to uninstall the application, which is to be deleted. Description has been given herein with regard to an application as an example, and a similar job for configuration information needs to be created so that a process is performed either to keep the current state, to incorporate information, or to delete information.

The environment-configuration-information creator 13 creates a job to perform a process corresponding to one of the possibilities (a) to (c) described above for each of one or more applications and configuration information included in the environment-configuration information (step S170). Processes to be performed thereafter need not differ from the processes in the case of the new multifunction peripheral 2b being brand new and will not be described.

Second Exemplary Embodiment

In the first exemplary embodiment, information to be incorporated into the new multifunction peripheral is specified with reference to the information that has been incorporated into the existing multifunction peripherals disposed within a predetermined region around the location of the new multifunction peripheral, in particular, in the above example, disposed in the same room where the new multifunction peripheral is disposed. In the present exemplary embodiment, information to be incorporated into the new multifunction peripheral is specified with reference to the information that has been incorporated into an existing multifunction peripheral that is used by a user who has a seat disposed within a predetermined region around the location of the new multifunction peripheral. In short, in the first exemplary embodiment, an existing multifunction peripheral that is to be referred to in incorporating information is directly specified based on the positional relation between the new multifunction peripheral and the existing multifunction peripheral. An existing multifunction peripheral that is to be referred to in incorporating information into the new multifunction peripheral needs to be disposed within a predetermined region around the location of the new multifunction peripheral. The term "an existing multifunction peripheral that is used by a user" indicates an existing multifunction peripheral 2a for which the user is registered as a machine user or for which usage history of the user is recorded.

In contrast, in the present exemplary embodiment, an existing multifunction peripheral that is to be referred to in incorporating information is indirectly specified based on the positional relation between the new multifunction peripheral and a seat. The existing multifunction peripheral to be specified in this procedure is an apparatus that is used by a user who has a seat disposed within a predetermined region around the location of the new multifunction peripheral, and the apparatus belongs to the same category as the new multifunction peripheral. The category of apparatus to which the new multifunction peripheral belongs is a category of apparatus to which every multifunction peripheral belongs. For example, a personal computer (PC) and an air conditioner belong to categories of apparatus that differ from the category of apparatus to which a multifunction peripheral belongs. Further, an existing multifunction peripheral to be specified need not be disposed within a predetermined region around the location of the new multifunction peripheral in the present exemplary embodiment. In other words, an existing multifunction peripheral disposed outside the predetermined region, for example, disposed on a different floor, which is described below, may be specified.

The block diagram of an apparatus management system 10 and data structures of various kinds of information may be the same in the present exemplary embodiment as in the first exemplary embodiment.

Next, operation in the present exemplary embodiment will be described, and the operation may basically be the same as the operation in the first exemplary embodiment. A set-up process for new multifunction peripheral in the present exemplary embodiment will be described below. The process flow is similar to the process flow in the first exemplary embodiment, which is described with reference to FIG. 8. However, the process to specify an existing multifunction peripheral 2a (step S120) is different.

Specifically, in the first exemplary embodiment, the environment-configuration-information creator 13 refers to the floor information (multifunction peripheral) and specifies the multifunction peripherals MFP-A, MFP-B, and MFP-C as existing multifunction peripherals 2a that are to be referred to in incorporating information. The multifunction peripherals MFP-A, MFP-B, and MFP-C are disposed in the room 6, where the multifunction peripheral MFP-X is to be disposed. The environment-configuration-information creator 13 in the present exemplary embodiment refers to the floor information (seat) and specifies one or more users who have a seat disposed in the room 6, where the multifunction peripheral MFP-X is to be disposed. Alternatively, not all the users who have a seat disposed in the room 6 but one or more users who have a seat within a predetermined distance from the location at which the multifunction peripheral MFP-X is to be disposed may be selected from the users who have a seat disposed in the room 6 and specified. Then, the environment-configuration-information creator 13 refers to the information regarding the specified users and specifies one or more multifunction peripherals for which the specified users have been registered as a machine user or for which usage history of the specified users has been recorded.

A single user may have seats disposed in multiple rooms. For example, a user having a user ID "u0002" registered in the user information depicted in FIG. 2 (hereinafter, referred to as "user u0002") has seats disposed in multiple rooms. In such a case, one or more existing multifunction peripherals 2a disposed in each room are specified in the present exemplary embodiment. Alternatively, one or more existing multifunction peripherals 2a for which the specified users have been registered as a machine user may be specified. In this case, one or more multifunction peripherals to be specified need not be disposed in a room where the seats used by the users are disposed.

A specific example will be described. It is assumed that a multifunction peripheral MFP-X is to be disposed in a room 6 on the fifth floor as in the first exemplary embodiment. The room 6 has a room number "501" according to the floor information. Seats A1 to F9 are disposed in the room 6 as depicted in FIG. 6. Information regarding the seat A2 in the floor information (seat) indicates that the user u0002 uses the seat A2. The user information indicates that the user u0002 also uses a seat having the seat ID "2B3" in a room situated on the second floor in addition to the seat A2 on the fifth floor. It is assumed here that multifunction peripherals MFP-D and MFP-E are disposed in the room situated on the second floor. In this case, the environment-configuration-information creator 13 in the present exemplary embodiment specifies the multifunction peripherals MFP-D and MFP-E in addition to the multifunction peripherals MFP-A, MFP-B, and MFP-C as existing multifunction peripherals 2a that are to be referred to when information to be incorporated into the multifunction peripheral MFP-X is specified (step S120). This is because the user u0002 uses the multifunction peripherals MFP-A, MFP-B, and MFP-C and the multifunction peripherals MFP-D and MFP-E.

For example, the apparatus information depicted in FIG. 4 may contain information to specify a user who has an account on a multifunction peripheral 2 listed in the apparatus information, or the user information depicted in FIG. 2 may contain information to specify a multifunction peripheral 2 on which a user listed in the user information has an account. In this way, the apparatus information and the user information may be associated and may contain information regarding which user has been registered as a machine user for which multifunction peripheral 2. For example, a user who has an account to use a multifunction peripheral 2 as described above is designated as "being registered as a machine user for a multifunction peripheral 2". For example, by referring to registration information regarding user accounts on multifunction peripherals 2 in this way, if it can be determined that the user u0002 has an account on the multifunction peripheral MFP-D and not on the multifunction peripheral MFP-E, the environment-configuration-information creator 13 may perform a process in step S120 so as to specify the multifunction peripherals MFP-A, MFP-B, MFP-C, and MFP-D as an existing multifunction peripheral 2a that is to be referred to in specifying information to be incorporated into the multifunction peripheral MFP-X.

In summary, in the present exemplary embodiment, information incorporated into the multifunction peripherals MFP-D and MFP-E, which are used by the user u0002 on the second floor, is referred to when information to be incorporated into the multifunction peripheral MFP-X, which is to be newly disposed on the fifth floor, is specified. In other words, configurations incorporated into the multifunction peripherals MFP-D and MFP-E, which are used by the user u0002 on the second floor, can also be incorporated into the multifunction peripheral MFP-X, which is to be disposed on the fifth floor.

As described above, in the present exemplary embodiment, the process (step S120) to specify an existing multifunction peripheral 2a that is referred to when information is incorporated into the new multifunction peripheral 2b differs from the process in the first exemplary embodiment.

In the first exemplary embodiment, after specifying in step S140 one or more applications installed on the existing multifunction peripherals 2a, which are specified in step S120, the environment-configuration-information creator 13 refers to the usage-history information and extracts one or more applications that have a usage record for the existing multifunction peripherals 2a from the applications that have been specified. In contrast, in the present exemplary embodiment, after specifying one or more applications installed on the existing multifunction peripherals 2a, which are specified in step S120, the environment-configuration-information creator 13 refers to the usage-history information and extracts one or more applications that have been used by one or more users who have a seat disposed within a predetermined region around the new multifunction peripheral 2b from the applications that have been specified. Other processes are the same as those in the first exemplary embodiment and will not be described.

Although all the existing multifunction peripherals 2a are treated equally in the above description, weights may be assigned to the existing multifunction peripherals 2a in accordance with some criterion, for example, a distance between the new multifunction peripheral 2b and an existing multifunction peripheral 2a. For example, information incorporated into the multifunction peripherals MFP-A, MFP-B, and MFP-C, which are disposed on the fifth floor, where the multifunction peripheral MFP-X is disposed, may be weighted more than information incorporated into the multifunction peripherals MFP-D and MFP-E, which are not disposed on the same floor as the multifunction peripheral MFP-X.

Third Exemplary Embodiment

The first and second exemplary embodiments described above share common characteristics in that a new multifunction peripheral is to be disposed in a new environment. However, the environment in which a new multifunction peripheral is disposed may change after the new multifunction peripheral has been disposed. For example, an existing multifunction peripheral may be removed from the room, or a seat of a user may be moved to another room. Although a new multifunction peripheral becomes an existing multifunction peripheral by incorporating information after being disposed, the incorporated information may be reviewed and updated, if necessary, in accordance with a change in the environment in which the multifunction peripheral is disposed.

Accordingly, the information manager 11 sends notification to a manager when information to be managed has been updated. If the manager receives the notification and determines that information incorporated into an existing multifunction peripheral is to be updated, the manager gives instructions for updating the information to the apparatus management system 10. The manager may give instructions by specifying an existing multifunction peripheral whose information is to be updated. Then, in response to the instructions from the manager, the apparatus management system 10 starts to specify information to be incorporated into the existing multifunction peripheral.

It is assumed that the apparatus management system 10 sends a query to the manager as to whether to update information, but when update on the floor information or on the apparatus information is detected, the apparatus management system 10 may automatically provides update on the information to an existing multifunction peripheral that is related to the update on the information. An example of an existing multifunction peripheral that is related to the update on the information is a multifunction peripheral disposed in the same room as a multifunction peripheral to be removed. For example, if the multifunction peripheral MFP-A, which is disposed in a room on the fifth floor, is removed, the environment-configuration-information creator 13 assumes that the multifunction peripherals MFP-X, MFP-B, and MFP-C, which are disposed in the same room, are each a brand new multifunction peripheral and performs the set-up process for new multifunction peripheral described above on each of the multifunction peripherals MFP-X, MFP-B, and MFP-C to update the information.

Fourth Exemplary Embodiment

Employees do not have individually assigned desks in an office in some companies. Each employee in such a company finds an unoccupied desk to work at, and thus no fixed location is assigned to the employee. Situations in an office environment in which no fixed locations are assigned to employees can be addressed in the present exemplary embodiment.

Figure 9:
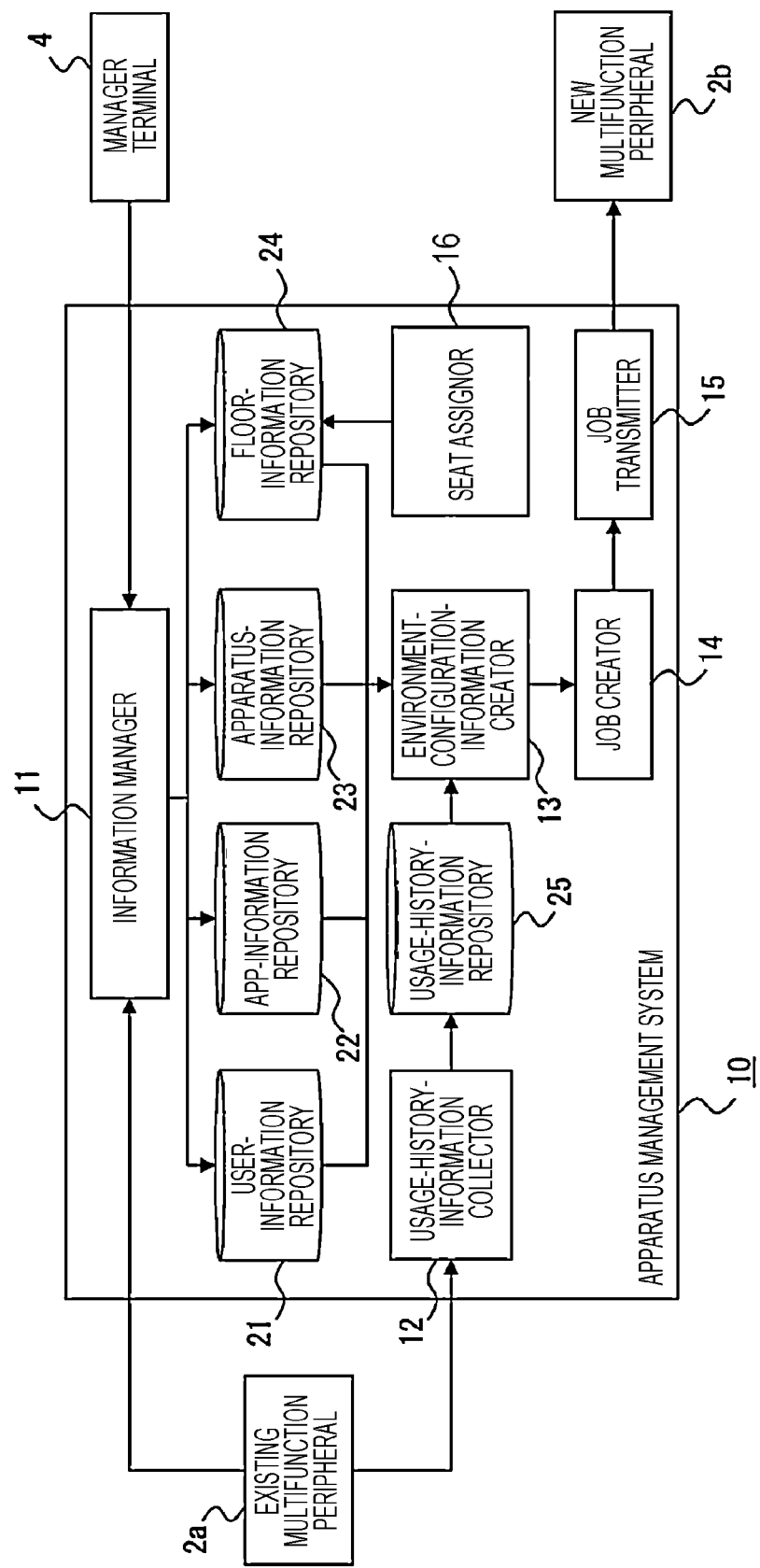
FIG. 9 is a block diagram depicting an example configuration of an apparatus management system according to a fourth exemplary embodiment.

FIG. 9 is a block diagram depicting an example configuration of an apparatus management system 10 according to the present exemplary embodiment. The apparatus management system 10 in the present exemplary embodiment has a configuration in which a seat assignor 16 is added to the apparatus management system 10 in the first exemplary embodiment. The same components described in the first exemplary embodiment are denoted by the same reference numerals and will not be described.

Next, operation in the present exemplary embodiment will be described. The operation differs from the operation in the first exemplary embodiment in that the item "seat" in the user information and the item "user" in the floor information (seat) have no data until a user finds a seat, or a seat is acquired by a user. Then, after finding a seat, the user starts a predetermined seat management application on a user terminal apparatus used by the user and establishes a link between the user and the seat, for example, by using the application to specify the seat that the user has found.

The seat assignor 16 is linked to the seat management application operating on the user terminal apparatus and acquires seat-assignment information that includes the user ID of the user transmitted from the user terminal apparatus and the seat ID of the seat specified by the user. Then, the seat assignor 16 assigns the acquired user ID to the item "user" at the position corresponding to the seat in the floor information (seat) and assigns the acquired seat ID to the item "seat" at the position corresponding to the user in the user information.

Subsequently, as in the third exemplary embodiment, the environment-configuration-information creator 13 assumes that an existing multifunction peripheral is a new multifunction peripheral and updates information incorporated into the existing multifunction peripheral by performing the set-up process for new multifunction peripheral described above in response to instructions from the manager or at a predetermined timing.

According to the present exemplary embodiment, a situation in which no fixed link between a user and a seat is present can be addressed.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:
1. An information processing apparatus comprising:
a processor configured to:
specify information to be incorporated into a first apparatus by referring to information incorporated into a second apparatus that differs from the first apparatus and that is disposed within a predetermined region around a location of the first apparatus,
wherein, in a case where a plurality of users use the second apparatus, the information to be incorporated into the first apparatus includes at least one of configuration information used by the plurality of users in common and configuration information used by the plurality of users individually, and
wherein, of the two kinds of configuration information, only the configuration information used by the plurality of users in common is specified as the information to be incorporated into the first apparatus.

2. The information processing apparatus according to claim 1,
wherein the information incorporated into the second apparatus includes one or more applications to be incorporated into the first apparatus, and
the processor is configured to:
acquire information regarding application-usage history on the second apparatus; and
specify an application as the information to be incorporated into the first apparatus by referring to the acquired information regarding application-usage history.

3. The information processing apparatus according to claim 1,
wherein the processor is configured to:
acquire information regarding usage history of information used by users on the second apparatus; and
specify the information to be incorporated into the first apparatus by referring to the acquired information regarding usage history.

4. The information processing apparatus according to claim 1,
wherein the processor is configured to start to specify the information to be incorporated into the first apparatus in response to an instruction from a user.

5. The information processing apparatus according to claim 1,
wherein, in a case where information is already incorporated into the first apparatus and a portion of the information already incorporated into the first apparatus is not included in information specified as the information to be incorporated into the first apparatus, the processor is configured to specify the portion of the information as information to be deleted.

6. The information processing apparatus according to claim 5,
wherein the processor is configured to create a job and to transmit the job to the first apparatus, and
wherein the job is either to incorporate information specified as information to be incorporated or to delete information specified as information to be deleted.

7. An information processing apparatus comprising:
a processor configured to:
specify information to be incorporated into a first apparatus by referring to information incorporated into a second apparatus that differs from the first apparatus and that is used by a user who has a seat disposed within a predetermined region around a location of the first apparatus, the second apparatus being of the same kind as the first apparatus,
wherein, in a case where a plurality of users use the second apparatus, the information to be incorporated into the first apparatus includes at least one of configuration information used by the plurality of users in common and configuration information used by the plurality of users individually, and
wherein, of the two kinds of configuration information, only the configuration information used by the plurality of users in common is specified as the information to be incorporated into the first apparatus.

8. The information processing apparatus according to claim 7,
wherein the information incorporated into the second apparatus includes one or more applications to be incorporated into the first apparatus, and
the processor is configured to:
acquire information regarding application-usage history on the second apparatus; and
specify an application as the information to be incorporated into the first apparatus by referring to the acquired information regarding application-usage history.

9. The information processing apparatus according to claim 7,
wherein, in a case where a plurality of users use the second apparatus, the information to be incorporated into the first apparatus includes at least one of configuration information used by the plurality of users in common and configuration information used by the plurality of users individually.

10. The information processing apparatus according to claim 9,
wherein, of the two kinds of configuration information, only the configuration information used by the plurality of users in common is specified as the information to be incorporated into the first apparatus.

11. The information processing apparatus according to claim 7,
wherein the processor is configured to:
acquire information regarding usage history of information used by users on the second apparatus used by the user; and
specify the information to be incorporated into the first apparatus by referring to the acquired information regarding usage history.

12. The information processing apparatus according to claim 7,
wherein the processor is configured to start to specify the information to be incorporated into the first apparatus in response to an instruction from a user.

13. The information processing apparatus according to claim 7,
wherein, in a case where information is already incorporated into the first apparatus and a portion of the information already incorporated into the first apparatus is not included in information specified as the information to be incorporated into the first apparatus, the processor is configured to specify the portion of the information as information to be deleted.

14. The information processing apparatus according to claim 13,
wherein the processor is configured to create a job and to transmit the job to the first apparatus, and
wherein the job is either to incorporate information specified as information to be incorporated or to delete information specified as information to be deleted.

15. A non-transitory computer readable medium storing a program causing a computer to execute a process, the process comprising:
specifying information to be incorporated into a first apparatus by referring to information incorporated into a second apparatus that differs from the first apparatus and that is used by a user who has a seat disposed within a predetermined region around a location of the first apparatus, the second apparatus being of the same kind as the first apparatus, wherein, in a case where a plurality of users use the second apparatus, the information to be incorporated into the first apparatus includes at least one of configuration information used by the plurality of users in common and configuration information used by the plurality of users individually, wherein, of the two kinds of configuration information, only the configuration information used by the plurality of users in common is specified as the information to be incorporated into the first apparatus.

* * * * *